United States Patent
Keum et al.

(10) Patent No.: US 11,824,919 B2
(45) Date of Patent: Nov. 21, 2023

(54) SYSTEM AND METHOD FOR FORCE RUNNING OF REMOTE SUPPORT, AND CLIENT FOR EXECUTING THE SAME

(71) Applicant: SAMSUNG SDS CO., LTD., Seoul (KR)

(72) Inventors: Yu Hwan Keum, Seoul (KR); Dae Hyuck Im, Seoul (KR); Seung Yong Shin, Seoul (KR); You Dong Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 17/511,843

(22) Filed: Oct. 27, 2021

(65) Prior Publication Data
US 2022/0131926 A1    Apr. 28, 2022

(30) Foreign Application Priority Data
Oct. 27, 2020    (KR) .................. 10-2020-0140750

(51) Int. Cl.
| | |
|---|---|
| *G06F 15/16* | (2006.01) |
| *H04L 67/025* | (2022.01) |
| *H04W 4/14* | (2009.01) |
| *H04L 67/125* | (2022.01) |
| *H04L 67/55* | (2022.01) |

(52) U.S. Cl.
CPC .......... *H04L 67/025* (2013.01); *H04L 67/125* (2013.01); *H04L 67/55* (2022.05); *H04W 4/14* (2013.01)

(58) Field of Classification Search
CPC ...... H04L 67/125; H04L 67/025; H04W 4/14; H04W 12/084; H04W 88/04; H04W 12/37; G06F 21/305; G06F 9/452
See application file for complete search history.

(56) References Cited

U.S. PATENT DOCUMENTS

| | | | |
|---|---|---|---|
| 2011/0029671 A1* | 2/2011 | Deprun ............... | H04W 12/084 709/225 |
| 2011/0244928 A1* | 10/2011 | Cherpes .............. | H04M 3/5183 455/569.1 |
| 2014/0123180 A1* | 5/2014 | Xiao ................ | H04N 21/64753 725/37 |

(Continued)

FOREIGN PATENT DOCUMENTS

| | | | | |
|---|---|---|---|---|
| CN | 110225054 A | * | 9/2019 | ......... H04L 63/0876 |
| KR | 10-2019-0129238 A | | 11/2019 | |

*Primary Examiner* — Dustin Nguyen
*Assistant Examiner* — Hao H Nguyen
(74) *Attorney, Agent, or Firm* — The PL Law Group, PLLC (57) ABSTRACT

An apparatus for force running of remote support according an embodiment includes a remote support server configured to receive a remote support service request from an administrator, and transmit a generation request of code information for connection to a client to a relay server based on the remote support service request and a relay server configured to generate the code information based on the generation request received from the remote support server, transmit the code information to the client based on a transmission scheme set according to the remote support service request, and relay a remote support service between the client and the remote support server by being connected to the client that has received the code information.

12 Claims, 8 Drawing Sheets

(56) References Cited

U.S. PATENT DOCUMENTS

| | | | | |
|---|---|---|---|---|
| 2014/0156785 | A1* | 6/2014 | Kammula | H04L 67/55 709/217 |
| 2015/0319178 | A1* | 11/2015 | Desai | G06F 9/451 726/1 |
| 2016/0054866 | A1* | 2/2016 | Miyamoto | H04L 41/06 715/709 |
| 2016/0156604 | A1* | 6/2016 | Oh | H04L 63/101 726/4 |
| 2017/0195523 | A1* | 7/2017 | Lim | H04L 67/125 |
| 2017/0310832 | A1* | 10/2017 | Fukushima | H04L 12/4625 |
| 2018/0019909 | A1* | 1/2018 | Tanabe | H04L 65/1069 |
| 2018/0067707 | A1* | 3/2018 | Fukushima | G06F 11/0733 |
| 2018/0097949 | A1* | 4/2018 | Mochizuki | H04N 1/00384 |
| 2019/0011997 | A1* | 1/2019 | Wisnia | G06F 9/453 |
| 2019/0073166 | A1* | 3/2019 | Fukushima | G06F 3/121 |
| 2019/0098695 | A1* | 3/2019 | Huang | H04W 76/18 |
| 2019/0230569 | A1* | 7/2019 | Kim | H04W 36/0005 |
| 2020/0195654 | A1* | 6/2020 | Xiang | H04M 3/00 |
| 2021/0241333 | A1* | 8/2021 | Lindsey | G06Q 40/02 |
| 2021/0297417 | A1* | 9/2021 | Pogrebinsky | H04L 63/107 |
| 2021/0349537 | A1* | 11/2021 | Kuruva | G06V 20/20 |
| 2022/0086792 | A1* | 3/2022 | Li | H04W 72/20 |

\* cited by examiner

FIG. 7

SYSTEM AND METHOD FOR FORCE RUNNING OF REMOTE SUPPORT, AND CLIENT FOR EXECUTING THE SAME

CROSS-REFERENCE TO RELATED APPLICATION

This application claims the benefit under 35 USC § 119(a) of Korean Patent Application No. 10-2020-0140750, filed on Oct. 27, 2020, in the Korean Intellectual Property Office, the entire disclosure of which is incorporated herein by reference for all purposes.

BACKGROUND

1. Field

The disclosed embodiments relate to a technique for forcibly executing a remote support service in a mobile environment.

2. Description of Related Art

Recently, as many companies aim to provide mobile-oriented services, the center of work has shifted to the mobile environment, and naturally, solving various issues that occur in the mobile environment as well as the existing PC has become a major concern.

However, conventionally, in order to solve issues occurring in multiple terminals, a user of terminal had to contact an administrator through e-mail, phone, messenger, etc., or the user of the terminal had to visit the administrator even offline, and thus it was inconvenient that excessive time and effort were required to resolve the issue.

To solve this, a remote support service that solves the issue by remotely operating the terminal by the administrator is in the spotlight, but in order to execute the remote support service in the terminal, there is still a problem that the user of the terminal has to perform a separate operation, such as inputting a passcode transmitted from the administrator.

SUMMARY

The disclosed embodiments are intended to provide a means for improving user convenience by forcibly executing a remote support service.

An system for force running of remote support according an embodiment of the disclosure includes a remote support server configured to receive a remote support service request from an administrator, and transmit a generation request of code information for connection to a client to a relay server based on the remote support service request and a relay server configured to generate the code information based on the generation request received from the remote support server, transmit the code information to the client based on a transmission scheme set according to the remote support service request, and relay a remote support service between the client and the remote support server by being connected to the client that has received the code information.

The remote support server is further configured to receive an address of a tenant management server from a routing server based on tenant identification information included in the remote support service request, obtain an address of the relay server that exists in the same region as the address of the tenant management server, and transmit the generation request to the relay server based on the address of the relay server.

The code information may include region information in which the address of the relay server exists, execution information indicating whether or not to forcibly execute the remote support service, and place information for determining a connection place on the relay server.

The code information may be generated as a combination of one or more numbers corresponding to the region information, one or more numbers corresponding to the execution information, and one or more numbers corresponding to the place information.

The relay server is further configured to transmit a short message including the code information to the client when the transmission scheme is a short message service, and may transmit a push message including the code information to the client when the transmission scheme is a push messaging.

A client according an embodiment of the disclosure includes a code information receiver configured to receive code information for connection to a terminal from a relay server for relaying a remote support service provided by a remote support server, a connection determinator configured to determine whether or not to connect between the relay server and the terminal based on the code information and authorization delegation setting of the terminal, and an agent configured to control the terminal based on a control signal transmitted from the remote support server when the remote support service is executed or shares a screen of the terminal with the remote support server.

The connection determinator is further configured to determine whether or not to forcibly execute the remote support service based on the code information, connect the relay server and the terminal regardless of the authority delegation setting of the terminal when it is determined that the remote support service is forcibly executed, and when it is determined that the remote support service is executed according to a preset setting of the terminal, connect the relay server and the terminal only when the authority of the terminal is delegated.

The agent is further configured to execute the remote support service by accessing a connection place on the relay server based on the code information, when connected to the relay server.

The agent may be automatically executed when the code information receiver receives the code information.

A method for force running of remote support according an embodiment of the disclosure includes receiving, by a remote support server, a remote support service request from an administrator, transmitting, by the remote support server, a generation request of code information for connection to a client to a relay server based on the remote support service request, generating, by the relay server, the code information based on the generation request received from the remote support server, and transmitting, by the relay server, the code information to the client based on a transmission scheme set according to the remote support service request, relaying, by the relay server being connected to the client that has received the code information, a remote support service between the client and the remote support server.

The transmitting of the generation request of code information may include receiving, by the remote support server, an address of a tenant management server from a routing server based on tenant identification information included in the remote support service request, obtaining, by the remote support server, an address of the relay server that exists in the same region as the address of the tenant management server, and, transmitting the generation request to the relay server based on the address of the relay server.

The code information may include region information in which the address of the relay server exists, execution information indicating whether or not to forcibly execute the remote support service, and place information for determining a connection place on the relay server.

The code information may be generated as a combination of one or more numbers corresponding to the region information, one or more numbers corresponding to the execution information, and one or more numbers corresponding to the place information.

In the transmitting of the code information to the client includes transmitting a short message including the code information to the client when the transmission scheme is a short message service, and transmitting a push message including the code information to the client when the transmission scheme is push messaging.

A method for force running of remote support according to another embodiment of the disclosure includes receiving, by a code information receiver of a client, code information for connection to a terminal from a relay server for relaying a remote support service provided by a remote support server, determining, by a connection determinator of the client, whether or not to connect between the relay server and the terminal based on the code information and authorization delegation setting of the terminal, and controlling, by an agent of the client, the terminal based on a control signal transmitted from the remote support server when the remote support service is executed or sharing a screen of the terminal with the remote support server.

The determining whether or not to connect between the relay server and the terminal may include determining, by the connection determinator, whether or not to forcibly execute the remote support service based on the code information, connecting, by the connection determinator, the relay server and the terminal regardless of the authority delegation setting of the terminal when it is determined that the remote support service is forcibly executed, and when it is determined that the remote support service is executed according to a preset setting of the terminal, by the connection determinator, connecting the relay server and the terminal only when the authority of the terminal is delegated.

The method for force running of remote support according to another embodiment of the disclosure may further include, after the determining whether or not to connect between the relay server and the terminal, executing, by the agent, the remote support service by accessing a connection place on the relay server based on the code information when connected to the relay server The agent may be automatically executed when the code information receiver receives the code information.

According to the disclosed embodiments, the convenience of a client side user can be improved by minimizing information that has to be input on the client side in order to use a remote support service. Conventionally, there is an inconvenience in that the client side user who wants to use the remote support service has to directly input a passcode or the like into a client terminal. However, according to the disclosed embodiments, the inconvenience in this process can be minimized.

Also, according to the disclosed embodiments, system level security can be improved when the remote support service is executed by determining the conditions for forcibly executing the remote support service in consideration of both the administrator's settings and the client side user's settings.

Also, according to the disclosed embodiments, the remote support service can be flexibly provided according to the settings on the client side by allowing the scheme of providing code information to be selected prior to executing the remote support service.

DETAILED DESCRIPTION

Hereinafter, a specific embodiment will be described with reference to the drawings. The following detailed description is provided to aid in a comprehensive understanding of the methods, apparatus and/or systems described herein. However, this is only an example, and the disclosed embodiments are not limited thereto.

In describing the embodiments, when it is determined that a detailed description of related known technologies related to the present disclosure may unnecessarily obscure the subject matter of the disclosed embodiments, a detailed description thereof will be omitted. In addition, terms to be described later are terms defined in consideration of functions in the present disclosure, which may vary according to the intention or custom of users or operators. Therefore, the definition should be made based on the contents throughout this specification. The terms used in the detailed description are only for describing embodiments, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, parts or combinations thereof, other than those described.

Figure 1:
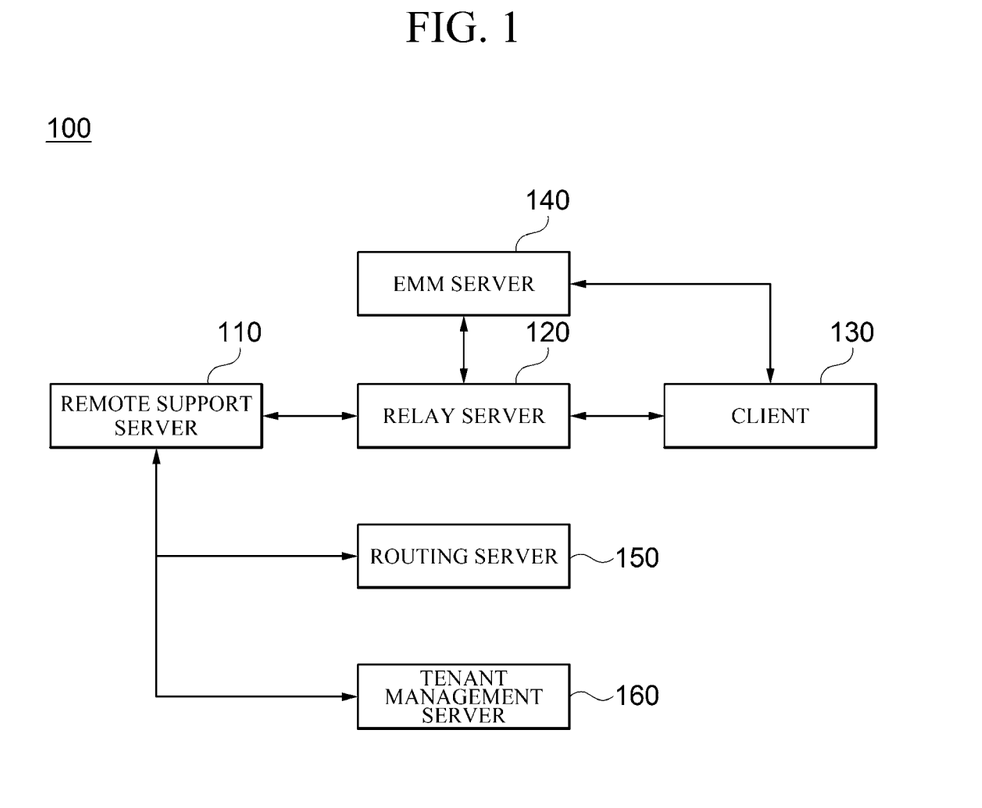
FIG. 1 is a block diagram for describing a detailed configuration of a system for force running of remote support according to an embodiment.

FIG. 1 is a block diagram for describing a detailed configuration of a system 100 for force running of remote support according to an embodiment.

As illustrated, the system 100 for force running of remote support according to an embodiment includes a remote support server 110 and a relay server 120. In addition, according to an embodiment, at least one of a client 130, an EMM (enterprise mobility management) server 140, a routing server 150, and a tenant management server 160 may be further included.

In the illustrated embodiment, each of the components may have different functions and capabilities other than those described below, and may include additional components in addition to those described below.

The remote support server 110 is a computing device operated by an administrator to provide a remote support service to the client 130, and may be, for example, a PC, a notebook computer, or the like. In the following embodiments, the remote support service refers to a service in which a remote support server 110 side administrator remotely connects to the client 130 through the remote support server 110 to diagnose and process a problem or error in real time when the problem or error occurs in performing a specific function in the client 130.

To this end, the remote support server 110 may include a remote support viewer for providing the remote support service, and may transmit a series of control signals to the client 130 through the remote support viewer and share screen information of the client 130.

Meanwhile, the relay server 120 is a server that relays data between the remote support server 110 and the client 130. The relay server 120 serves to maintain a bidirectional connection between the remote support server 110 and the client 130, and record logs related to the remote support server 100 and the client 130. In this case, data transmitted and received between the relay server 120 and the remote support server 110 and the client 130 may be encrypted data.

One or more such relay servers 106 may exist for each preset region.

Meanwhile, the client 130 is a terminal that is remotely connected according to a remote support service request of the administrator of the remote support server 110, and may be, for example, a desktop PC, a laptop computer, a tablet PC, or a smart phone.

The client 130 may include an agent (or application) for executing the remote support service, and may receive the remote support service from the remote support server 110 through the agent. The agent may perform various functions such as, for example, screen sharing for a remote support service, handling of events such as an administrator's screen click/execution of an application, and other application settings.

Meanwhile, the enterprise mobility management (EMM) server 140 is a server in which the client 130 that can be a target of the remote support service is registered through the agent (or application) provided in the client 130. The EMM server 140 may provide various functions to the registered client 130, such as device management, application services provided to the device, content management, etc.

Meanwhile, the routing server 150 is a server connected to a plurality of tenant management servers 160 to store a series of information about the plurality of tenant management servers 160. The routing server 150 may receive tenant identification information from the remote support server 110, and transmit an address of the tenant management server 160 corresponding to the tenant identification information to the remote support server 110. According to an embodiment, the routing server 150 may store a series of information about the plurality of tenant management servers 160 on the cloud, and in this case, the routing server 150 may be referred to as a cloud routing server (CRS).

Meanwhile, the tenant management server 160 (TMS) is a server that manages the tenant identification information and address of the EMM server 140 capable of being connected for each tenant (or each region). Like the relay server 120, one or more tenant management servers 160 may exist in each preset region.

Hereinafter, the role played by each configuration for providing a remote support service will be described in detail.

The remote support server 110 receives the remote support service request from the administrator, and transmits a generation request of code information for connection to the client 130 to relay server 120 based on the remote support service request.

According to one embodiment, the remote support service request may be delivered from the administrator to the remote support server 110 through the EMM server 140, and the remote support service request delivered from the EMM server 140 may include the following information, but is not necessarily limited thereto.

(1) tenant identification information
(2) phone number of the terminal that is the target of the remote support service
(3) identification information of the terminal that is the target of the remote support service
(4) information related to whether or not to forcibly execute the remote support service
(5) information related to the transmission scheme of code information
(6) remote support service execution instruction According to an embodiment, the remote support server 110 may transmit the generation request of code information for connection to the client 130 to the relay server 120 through the following processes. In this regard, description it will be made later with reference to FIG. 2.

(1) receiving the address of the tenant management server 160 from the routing server 150 based on the tenant identification information included in the remote support service request
(2) obtaining the address of the relay server 120 that exists in the same region as the address of the tenant management server 160
(3) transmitting a generation request of code information to the relay server 120 based on the address of the relay server 120

Specifically, in relation to the process (1), when the remote support server 110 transmits the tenant identification information included in the remote support service request received from the EMM server 140 to the routing server 150, the routing server 150 may transmit the address of the tenant management server 160 corresponding to the transmitted tenant identification information to the remote support server 110.

Specifically, in relation to the process (2), the remote support server 110 may check the address of the tenant management server 160 received from the routing server 150, check in which region the corresponding tenant management server 160 exists, and then obtain the address of the relay server 120 existing in the same region.

Specifically, prior to the above process (3), when the remote support server 110 transmits the tenant identification information to the tenant management server 160, the tenant management server 160 may transmit the address of the EMM server 140 corresponding to the tenant identification information to the remote support server 110. The transmitted address of the EMM server 140 may then be used in the remote support server 110 in order to communicate with the EMM server 140.

Specifically, prior to the process (3), the remote support server 110 may perform a pre-work for encryption so that information can be safely exchanged with the relay server 120.

That is, in other words, the remote support server 110 may generate a public key and a private key, and transmit the generated public key to the relay server 120. Thereafter, the relay server 120 may generate an advanced encryption standard (AES) key based on the received public key and transmit the AES key to the remote support server 110. Thereafter, the remote support server 110 may determine whether the relay server 120 is trustworthy by comparing the AES key and the secret key transmitted from the relay server 120.

The relay server 120 generates code information based on a generation request received from the remote support server.

Also, the relay server 120 transmits the code information to the client 130 based on the transmission scheme set according to the remote support service request, and connects with the client 130 that has received the code information. and relays the remote support service between the client 130 and the remote support server 110.

According to an embodiment, the relay server 120 may transmit the code information to the client 130 as well as to the remote support server 110. In this case, in transmitting the code information to the remote support server 110, the relay server 120 may depend on a scheme in which the generation request of code information is transmitted without depending on the transmission scheme.

According to an embodiment, the relay server 120 may transmit in a different form of code information when the transmission scheme set according to a remote support service request is a short message service (SMS) and push messaging, respectively.

Specifically, when the transmission scheme is the short message service, the relay server 120 may transmit a short message including code information to the client 130.

Meanwhile, specifically, when the transmission scheme is the push messaging, the relay server 120 may transmit a push message including code information to the client 130.

According to one embodiment, the code information may include region information in which the address of the relay server 120 exists, execution information indicating whether or not to forcibly execute the remote support service, and place information for determining a connection place on the relay server 120.

Specifically, the code information may be generated as a combination of one or more numbers corresponding to the region information, one or more numbers corresponding to the execution information, and one or more numbers corresponding to the place information. In this regard, description will be made later with reference to FIG. 3.

Figure 2:
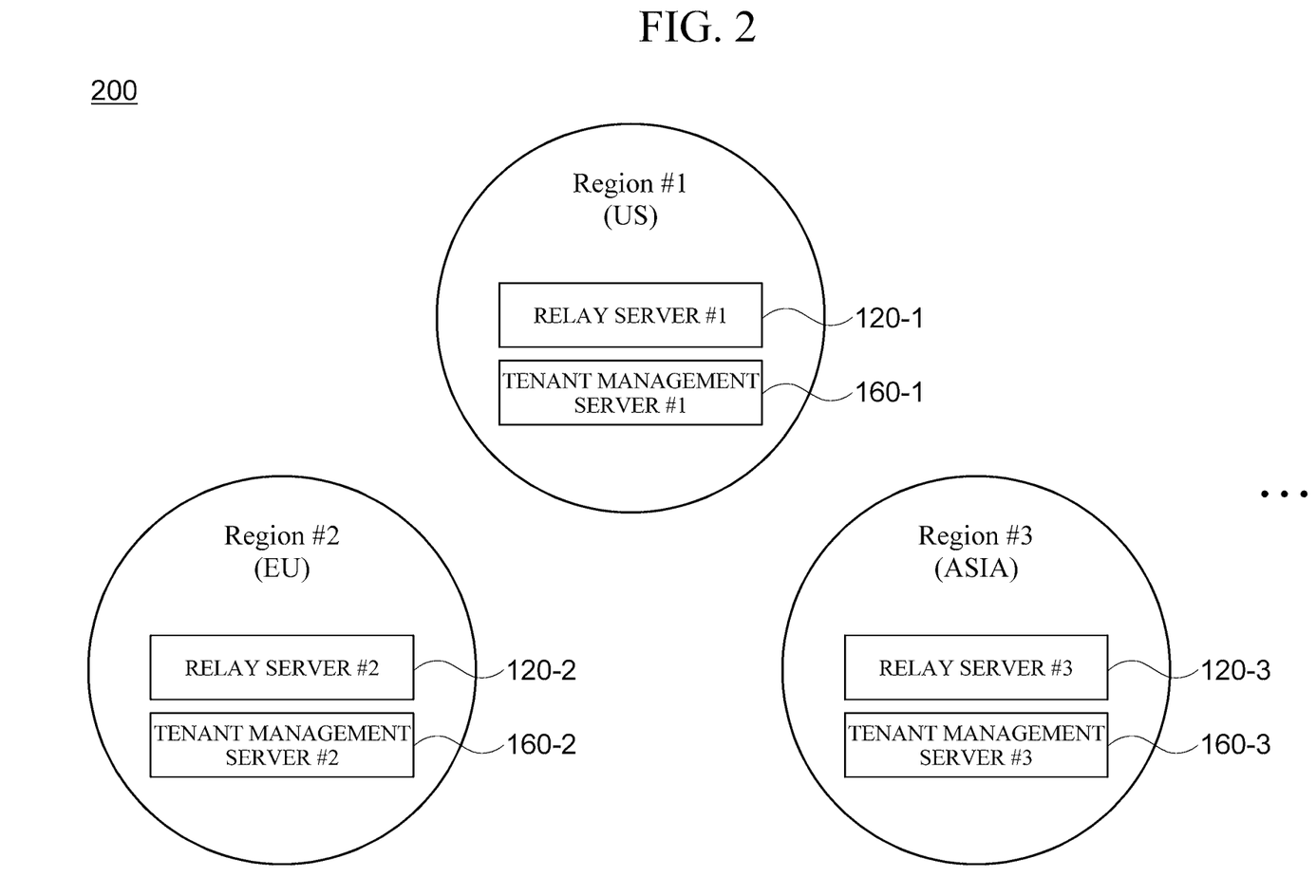
FIG. 2 is an exemplary diagram illustrating a relay server and a tenant management server for each region according to an embodiment.

FIG. 2 is an exemplary diagram illustrating a relay server and a tenant management server for each region according to an embodiment.

Referring to FIG. 2, a relay server #1 (120-1) and a tenant management server #1 (160-1) may exist in Region #1 (e.g., US region), a relay server #2 (120-2) and a tenant management server #2 (160-2) may exist in Region #2 (e.g., European region), and a relay server #3 (120-3) and a tenant management server #3 (160-3) may exist in Region #3 (e.g., Asian region). In FIG. 2, it is illustrated that only one relay server and one tenant management server exist for each region for convenience of explanation, but this is only an example and a plurality of relay s servers may exist in one region.

The remote support server 110 may determine one tenant management server 160 corresponding to the tenant identification information among a plurality of tenant management servers based on the tenant identification information obtained from the EMM server 140. Subsequently, the remote support server 110 may determine one relay server 120 to be used for relaying data related to the remote support service among the plurality of relay servers based on the region of the determined tenant management server 160.

Figure 3:
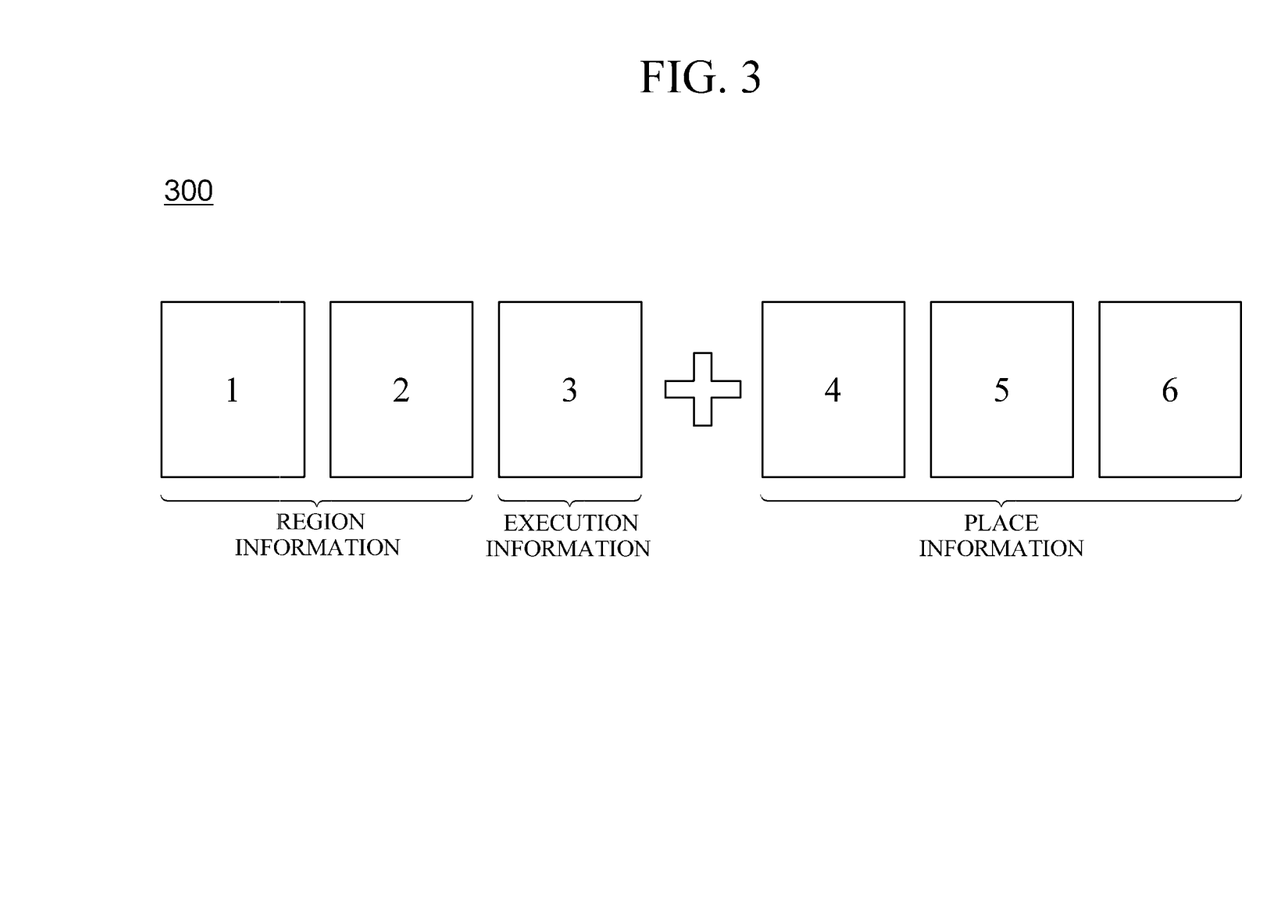
FIG. 3 is an exemplary diagram illustrating code information according to an embodiment.

FIG. 3 is an exemplary diagram illustrating code information according to an embodiment.

Referring to FIG. 3, code information according to an embodiment may include region information indicating a region where the relay server 120 exists, execution information indicating whether to forcibly execute the remote support service, and the remote support server 110 on the relay server, and place information indicating a place where the remote support server 110 and the client 130 are to be connected on the relay server.

For example, the region information in the code information illustrated in FIG. 3 may consist of a two-digit number ('12' in FIG. 3), and the execution information may consist of a single digit ('3' in FIG. 3), and the place information may consist of a three-digit number ('456' in FIG. 3).

According to one embodiment, a first digit of the two-digit number that makes up the region information may be a number indicating a relatively wide region, and may be, for example, an integer value of 2 to 5, where 2 indicates the European region, 3 indicates the US region, 4 indicates the Asian region, and 5 indicates other regions.

Meanwhile, according to an embodiment, the last digit of the two-digit number that makes up the region information may be a number indicating a relatively narrow region, and may be, for example, an integer value of 0 to 9, representing sub-regions obtained by being divided into ten sub-regions within the region specified by the preceding digit, for example.

Also, according to an embodiment, a single digit that makes up the execution information may be a number indicating whether or not to forcibly execute the remote support service or follow the settings of the client 130, and may be, for example, a value of 1 or 2 where 1 may indicate forced execution, and 2 may indicate execution according to settings of the client 130.

Also, according to an embodiment, the three-digit number constituting the place information may be a unique number that specifies a place (hereinafter referred to as 'room') at which the remote support server 110 and the client 130 are to be connected on the relay server, and may have a random value every time the unique number is generated.

Specifically, the three-digit number that makes up the place information is a number for identifying a room, and may have an integer value within a preset range, for example, may have an integer value of 0 or more and 999 or less.

Figure 4:
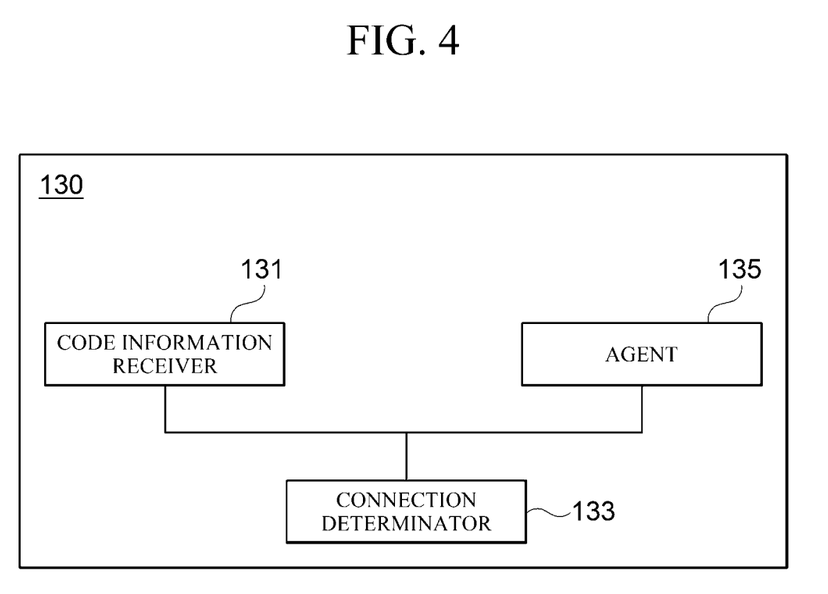
FIG. 4 is a block diagram illustrating a detailed configuration of a client according to an embodiment.

FIG. 4 is a block diagram for describing a detailed configuration of the client 130 according to an embodiment.

As illustrated, the client 130 according to an embodiment includes a code information receiver 131, a connection determinator 133, and an agent 135.

Hereinafter, a 'terminal' may be interpreted as meaning the client 130.

The code information receiver 131 receives code information for connection to the terminal from the relay server 120 for relaying the remote support service provided by the remote support server 110.

The connection determinator 133 determines whether or not to connect between the relay server and the terminal based on the code information and authorization delegation setting of the terminal.

According to an embodiment, the connection determinator 133 may determine whether or not to forcibly execute the remote support service based on the code information.

Specifically, the connection determinator 133 may determine whether to forcibly execute the remote support service based on the execution information included in the code information or whether to execute the remote support service in consideration of the setting of the client 130. To this end, the connection determinator 133 may refer to execution information by parsing the code information.

Subsequently, when it is determined that the remote support service is forcibly executed, the connection determinator 133 may connect the relay server 120 and the terminal regardless of the authority delegation setting of the terminal.

Meanwhile, when it is determined that the remote support service is executed according to a preset setting of the terminal, the connection determinator 133 may connect the relay server 120 and the terminal only when the authority of the terminal is delegated.

According to an embodiment, the preset setting of the terminal may indicate whether or not to delegate authority through the agent 135, which may mean whether or not the authority to execute the remote support service is delegated to the remote support server 110.

That is, when it is determined that the authority to execute the remote support service is delegated to the remote support server 110 according to the preset setting of the terminal, the connection determinator 133 may connect the relay server 120 and the terminal, but when it is determined that the authority to execute the remote support service is not delegated, the connection determinator 133 may request the user of the terminal to input the code information into the agent 135.

When the remote support service is executed, the agent 135 controls the terminal based on a control signal transmitted from the remote support server 110 or shares a screen of the terminal with the remote support server 110.

According to an embodiment, when the agent 135 is connected to the relay server 120, the agent 135 may execute the remote support service by accessing the connection place on the relay server 120 based on the code information.

According to an embodiment, the agent 135 may be automatically executed when the code information receiver 131 receives the code information. That is, the execution of the agent 135 is an essential process prior to the execution of the remote support service, and may provide user convenience when providing the remote support service as the agent 135 is automatically executed without the user of the client 130 needing to directly execute the agent 135.

In the illustrated embodiment, each of the components may have different functions and capabilities other than those described below, and may include additional components in addition to those described below.

Also, in one embodiment, the code information receiver 131, the connection determinator 133, and the agent 135 may be implemented using one or more physically separated devices, or may be implemented by one or more processors or a combination of one or more processors and software, and may not be clearly distinguished in specific operation unlike the illustrated example.

Figure 5:
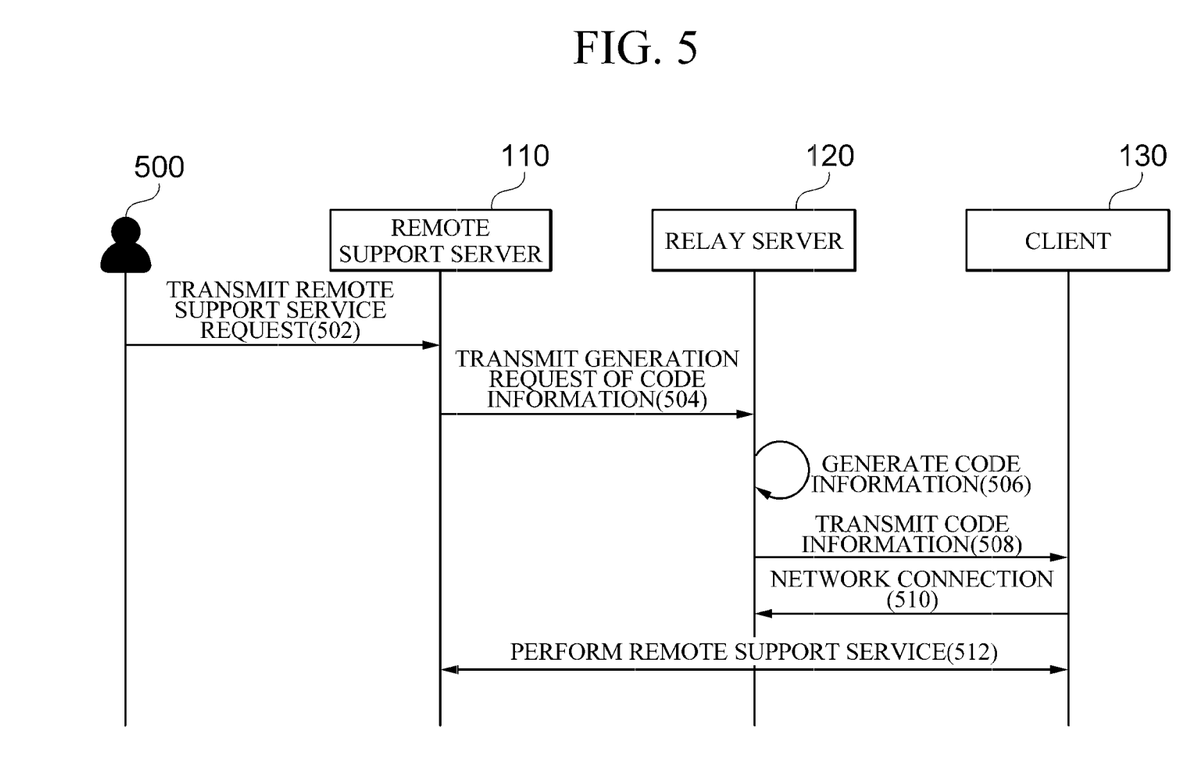
FIG. 5 is a flowchart illustrating a method for force running of remote support according to an embodiment.

FIG. 5 is a flowchart illustrating a method for force running of remote support according to an embodiment. In the illustrated flowchart, the method described above has been described by dividing the method into a plurality of steps, but at least some of the steps may be performed in a different order, performed in combination with other steps, or omitted, performed by being divided into detailed steps, or performed by being added with one or more steps (not illustrated).

In step 502, an administrator 500 transmits a remote support service request to the remote support server 110.

In step 504, the remote support server 110 transmits a generation request of code information for connection to the client to the relay server 120 based on the received remote support service request.

In step 506, the relay server 120 generates code information based on the generation request received from the remote support server 110.

In step 508, the relay server 120 transmits the code information to the client 130 based on a transmission scheme set according to the remote support service request.

In step 510, the client 130 receiving the code information connects to the relay server 120 through network connection.

In step 512, the relay server 120 relays the remote support service between the remote support server 110 and the network-connected client 130.

Figure 6A:
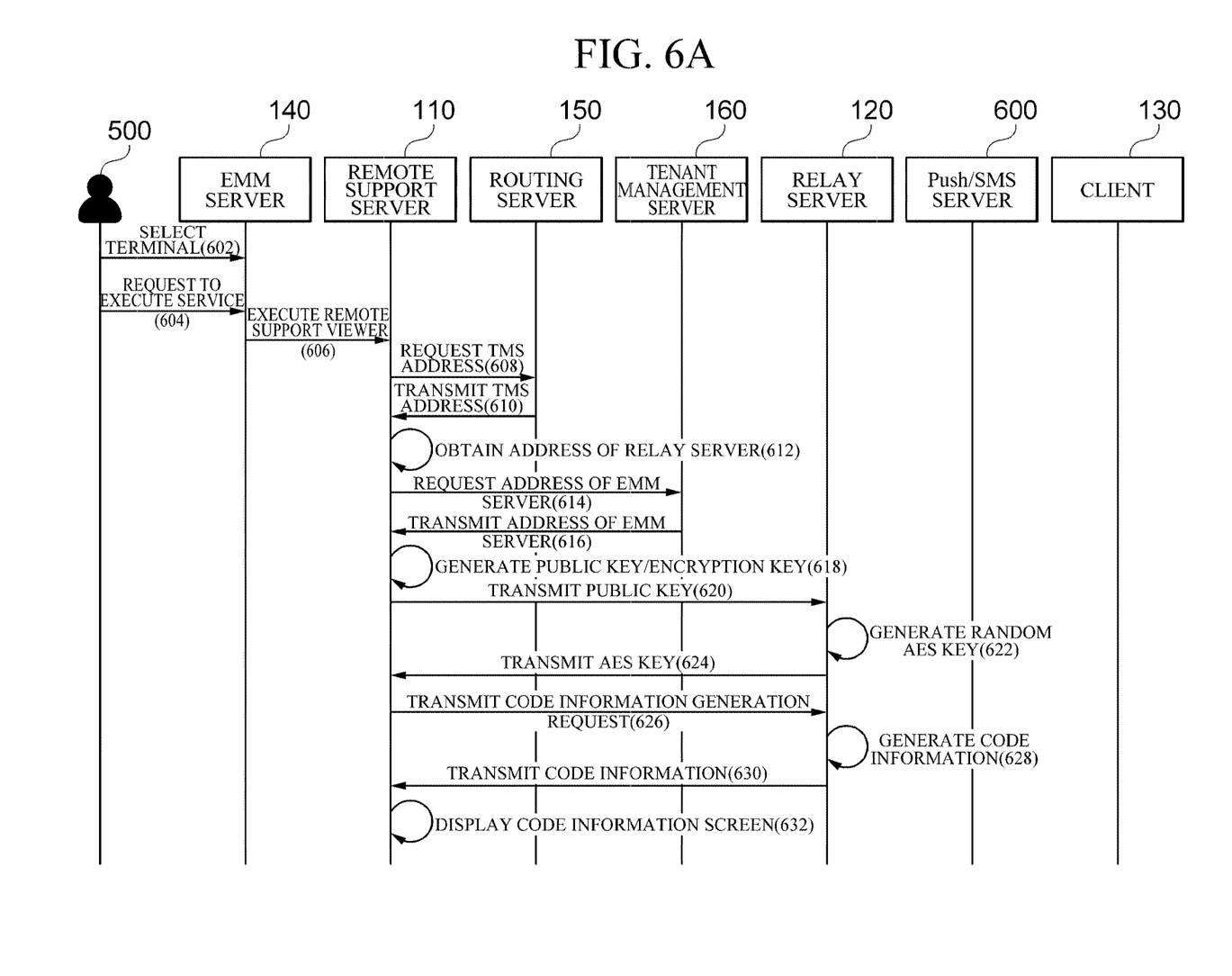
FIGS. 6A and 6B are flowcharts illustrating a method for force running of remote support according to an additional embodiment.
Figure 6B:
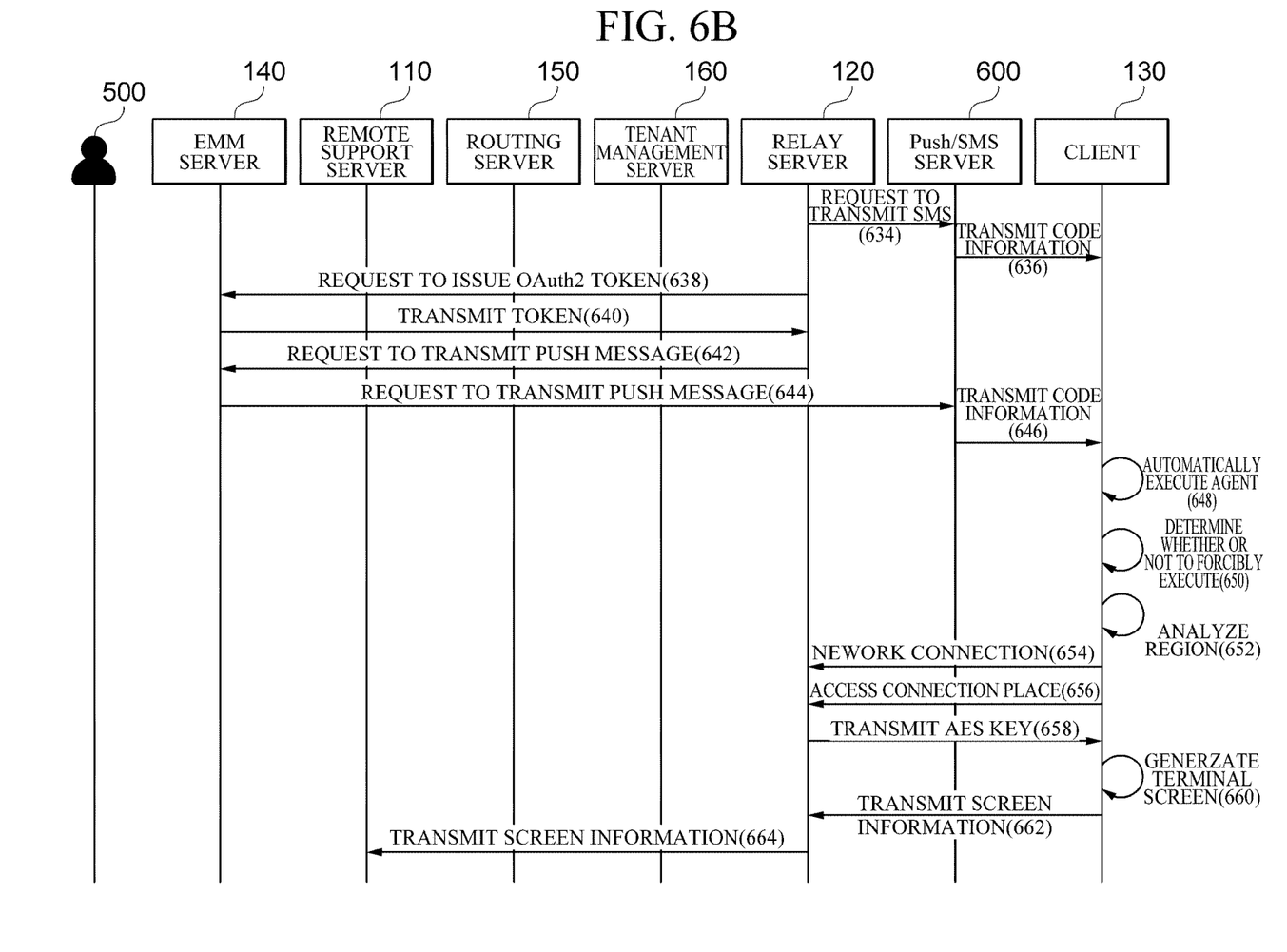

FIGS. 6A and 6B are flowcharts illustrating a method for force running of remote support according to an additional embodiment. FIGS. 6A and 6B are divided and illustrated for convenience of description, and the steps illustrated in FIG. 6B are performed following the steps illustrated in FIG. 6A. In the illustrated flowchart, the method described above has been described by dividing the method into a plurality of steps, but at least some of the steps may be performed in a different order, performed in combination with other steps, or omitted, performed by being divided into detailed steps, or performed by being added with one or more steps (not illustrated).

In step 602, the administrator 500 selects a terminal to be a target of the remote support service from among a plurality of terminals registered in the EMM server 140.

In step 604, the administrator 500 requests the EMM server 140 to execute the remote support service for the selected terminal.

In step 606, the EMM server 140 receiving the request from the administrator 500 instructs the remote support server 110 to run the remote support viewer.

In this case, the remote support viewer is an application driven under the environment provided by the remote support server 110, the EMM server 140 may instruct the remote support server 110 to run the remote support viewer, and at the same time, may transmit, to the remote support server 110, information about whether or not to forcibly execute remote support, information about the transmission scheme of code information, identification information of a terminal to be subjected to the remote support service, etc.

In step 608, the remote support server 110 delivers the identification information of the terminal to the routing server 150, and requests the routing server 150 to inform the region where the tenant management server 160 exists based on the identification information of the terminal.

In step 610, the routing server 150 transmits information about the region where the is tenant management server 160 exists to the remote support server 110 based on the identification information of the terminal.

In step 612, the remote support server 110 obtains the address of the relay server 120 based on information about the region where the tenant management server 160 exists.

In step 614, the remote support server 110 delivers the identification information of the terminal to the tenant management server 160, and requests the address of the EMM server 140 corresponding to the identification information of the terminal.

In step 616, the tenant management server 160 identifies the terminal using the identification information of the terminal, and transmits the address of the EMM server 140 in which the terminal is registered to the remote support server 110.

In step 618, the remote support server 110 generates a public key and an encryption key necessary for encrypting information transmitted and received when transmitting and receiving information with the relay server 120.

In step 620, the remote support server 110 transmits the generated public key to the relay server 120.

In step 622, the relay server 120 generates a random advanced encryption standard (AES) key based on the received public key.

In step 624, the relay server 120 transmits the randomly generated AES key to the remote support server 110.

In step 626, the remote support server 110 compares the received AES key with the encryption key, and transmits a generation request requesting to generate code information to the relay server 120 when the relay server 120 is trustworthy.

In this case, the generation request transmitted by the remote support server 110 may include information about the region where the relay server 120 exists, information about whether or not to forcibly execute the remote support service, information about the transmission scheme of code information, identification information of the terminal, etc.

In step 628, the relay server 120 generates code information based on the received code information generation request.

In this case, the code information may be generated as a combination of one or more numbers corresponding to the region information where the address of the relay server exists, one or more numbers corresponding to the execution information indicating whether or not to forcibly execute the remote support service, and one or more numbers corresponding to the place information for determining a connection place on the relay server.

In step 630, the relay server 120 transmits the generated code information to the remote support server 110.

In step 632, the remote support server 110 displays the received code information on a display (not illustrated) provided outside or inside the remote support server 110.

Hereinafter, steps 634 and 636 illustrate steps performed when the transmission scheme of code information is the short message service, and steps 638 to 646 illustrate steps performed when the transmission scheme of code information is the push messaging. Accordingly, it should be noted that some steps that do not correspond to the transmission scheme of code information may not be performed.

In step 634, when the transmission scheme of code information is the short message service, the relay server 120 requests an external SMS server 600 to transmit a short message including code information to the corresponding terminal using the phone number of the terminal received from the EMM server 140 in step 606 described above.

In step 636, the external SMS server 600 transmits the short message including code information to the terminal corresponding to the received phone number.

Meanwhile, in step 638, when the transmission scheme of code information is the push messaging, the relay server 120 requests token issuance for information exchange based on OAuth2 standard protocol with the EMM server 140.

In step 640, the EMM server 140 transmits an issued token to the relay server 120.

In step 642, the relay server 120 requests the EMM server 140 to transmit the push message for delivering code information to the client 130 using the authority delegated by the received token.

In this case, the relay server 120 transmits the code information to the EMM server 140 together with the request.

In step 644, the EMM server 140 requests the external push server 600 to transmit the push message including code information to the corresponding terminal using the terminal identification information included in the generation request received from the remote support server 110 in step 626 described above.

In step 646, the external push server 600 transmits the push message including code information to a terminal corresponding to the received identification information of the terminal.

In step 648, the client 130 automatically executes the agent after receiving the code information.

In step 650, the client 130 determines whether or not to forcibly execute the remote support service based on the code information.

In step 652, the client 130 analyzes a region where the address of the relay server 120 exists, based on the code information.

Meanwhile, the client 130 may subsequently generate the public key and the private key necessary for encrypting information transmitted and received when transmitting and receiving information with the relay server 120.

In step 654, the client 130 connects to the relay server 120 existing in the analyzed region through network connection.

In step 656, the client 130 transmits the public key to the relay server 120, and accesses the connection place on the relay server 120 based on the code information.

In step 658, the relay server 120 transmits the AES key generated based on the received public key to the client 130.

In step 660, the client 130 compares the received AES key with the secret key, and generates a screen of a terminal that is a target of the remote support service when the relay server 120 is trustworthy.

In step 662, the client 120 encrypts information about the generated screen and transmits the information to the relay server 120.

In this case, information about the screen may include information about a type, location, size, etc. of icons that make up the screen, information about saturation and brightness of the screen, information about an active window currently displayed on the screen, etc., but is not necessarily limited thereto. Any screen-related information required for the remote support may correspond to the information about the screen.

In step 664, the relay server 120 transmits the information about the screen received from the client 130 back to the remote support server 110.

In this way, the information about the screen generated by the client 130 can be forcibly transmitted to the remote support server 110, and in response to this, the remote support server 110 may generate and transmit a control signal for controlling the client 130.

Figure 7:
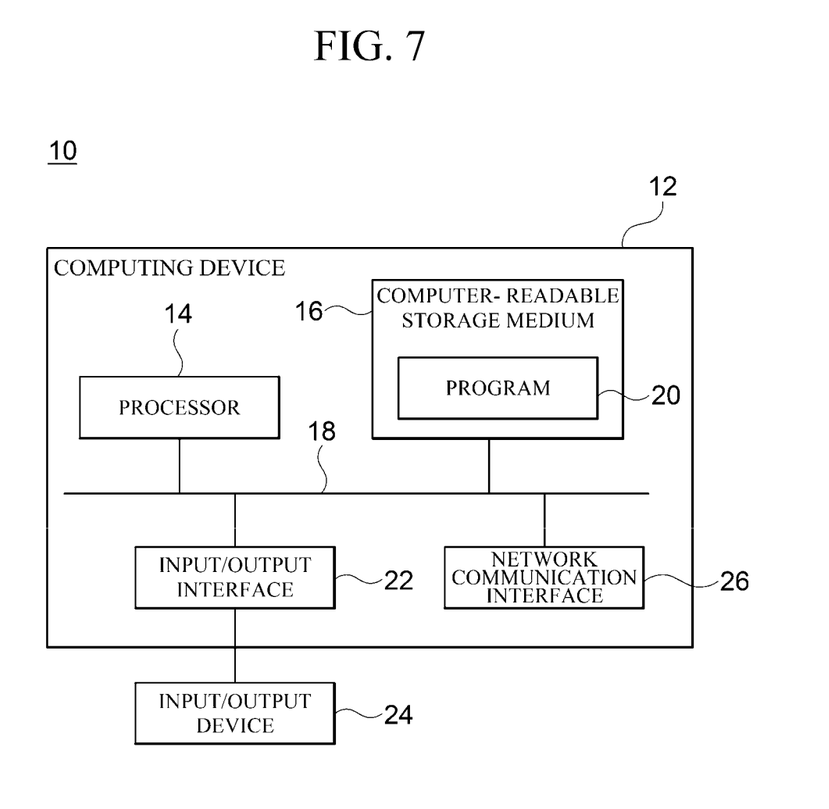
FIG. 7 is a block diagram illustratively describing a computing environment including a computing device according to an embodiment.

FIG. 7 is a block diagram for illustratively describing a computing environment 10 including a computing device according to an embodiment. In the illustrated embodiment, each component may have different functions and capabilities other than those described below, and may include additional components in addition to those described below.

The illustrated computing environment 10 includes a computing device 12. In an embodiment, the computing device 12 may be the remote support server 110. The computing device 12 may also be the relay server 120. The computing device 12 may also be the client 130. In addition, the computing device 12 may be the EMM server 140, the routing server 150, or the tenant management server 160.

The computing device 12 includes at least one processor 14, a computer-readable storage medium 16 and a communication bus 18. The processor 14 may cause the computing device 12 to operate according to the exemplary embodiment described above. For example, the processor 14 may execute one or more programs stored on the computer-readable storage medium 16. The computing device 12 includes at least one processor 14, a computer-readable storage medium 16 and a communication bus 18. The processor 14 may cause the computing device 12 to operate according to the exemplary embodiment described above. For example, the processor 14 may execute one or more programs stored on the computer-readable storage medium 16. The one or more programs may include one or more computer-executable instructions, which, when executed by the processor 14, may be configured such that the computing device 12 performs operations according to the exemplary embodiment.

The computer-readable storage medium 16 is configured such that the computer-executable instruction or program code, program data, and/or other suitable forms of information are stored. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a voice or sound input device, input devices such as various types of sensor devices and/or photographing devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

Meanwhile, the embodiment of the present disclosure may include a program for performing the methods described in this specification on a computer, and a computer-readable recording medium containing the program. The computer-readable recording medium may contain program instructions, local data files, local data structures, etc., alone or in combination. The computer-readable recording medium may be specially designed and configured for the present disclosure, or may be commonly used in the field of computer software. Examples of computer-readable recording media include magnetic media such as a hard disk, a floppy disk, and a magnetic tape, optical recording media such as a CD-ROM and a DVD, and hardware devices such as a ROM, a RAM, a flash memory, etc., that are specially configured such that program instructions are stored and executed are included. Examples of the program may include a high-level language code that can be executed by a computer using an interpreter, etc., as well as a machine language code generated by a compiler.

Although the present disclosure has been described in detail through representative is examples above, those skilled in the art to which the present disclosure pertains will understand that various modifications may be made thereto within the limits that do not depart from the scope of the present disclosure. Therefore, the scope of rights of the present disclosure should not be limited to the described embodiments, but should be defined not only by claims set forth below but also by equivalents of the claims.

What is claimed is:

1. An apparatus for force running of remote support, the apparatus comprising:

a remote support server configured to receive a remote support service request from an administrator, and transmit a generation request of code information for connection to a client to a relay server based on the remote support service request; and a relay server configured to generate the code information based on the generation request received from the remote support server, transmit the code information to the client based on a transmission scheme set according to the remote support service request, and relay a remote support service between the client and the remote support server by being connected to the client that has received the code information, wherein the generation request includes information related to the transmission scheme, wherein the relay server is further configured to transmit a short message including the code information to the client when the transmission scheme is a short message service, and transmit a push message including the code information to the client when the transmission scheme is a push messaging, wherein the code information comprises execution information indicating whether or not to forcibly execute the remote support service, region information in which the address of the relay server exists, and place information for determining a connection place on the relay server, wherein the place information is a unique number having a random value every time the unique number is generated.

2. The apparatus of claim 1, wherein the remote support server is further configured to receive an address of a tenant management server from a routing server based on tenant identification information included in the remote support service request, obtain an address of the relay server that exists in the same region as the address of the tenant management server, and transmit the generation request to the relay server based on the address of the relay server.

3. The apparatus of claim 1, wherein the code information is generated as a combination of one or more numbers corresponding to the region information, one or more numbers corresponding to the execution information, and one or more numbers corresponding to the place information.

4. A client comprising:
a code information receiver configured to receive code information for connection to a terminal from a relay server for relaying a remote support service provided by a remote support server;
a connection determinator configured to determine whether or not to connect between the relay server and the terminal based on the code information and authorization delegation setting of the terminal; and
an agent configured to control the terminal based on a control signal transmitted from the remote support server when the remote support service is executed or share a screen of the terminal with the remote support server,
wherein the code information comprises execution information indicating whether or not to forcibly execute the remote support service, region information in which the address of the relay server exists, and place information for determining a connection place on the relay server, wherein the place information is a unique number having a random value every time the unique number is generated,
wherein the connection determinator is further configured to:
determine whether or not to forcibly execute the remote support service based on the execution information;
connect the relay server and the terminal without receiving a separate request to access the terminal and without a user's input to grant an access to the terminal, regardless of the authority delegation setting of the terminal, when the remote support service is determined to be forcibly executed; and
when the remote support service is determined to be executed according to a preset setting of the terminal, connect the relay server and the terminal only when the authority of the terminal is delegated,
wherein the preset setting of the terminal indicates whether or not the authority to execute the remote support service is delegated to the remote support server.

5. The client of claim 4, wherein the agent is further configured to execute the remote support service by accessing a connection place on the relay server based on the code information, when connected to the relay server.

6. The client of claim 4, wherein the agent is automatically executed when the code information receiver receives the code information.

7. A method for force running of remote support, the method comprising:
receiving, by a remote support server, a remote support service request from an administrator;
transmitting, by the remote support server, a generation request of code information for connection to a client to a relay server based on the remote support service request;
generating, by the relay server, the code information based on the generation request received from the remote support server;
transmitting, by the relay server, the code information to the client based on a transmission scheme set according to the remote support service request; and
relaying, by the relay server being connected to the client that has received the code information, a remote support service between the client and the remote support server,
wherein the generation request includes information related to the transmission scheme,
wherein the transmitting of the code information to the client comprises:
transmitting a short message comprising the code information to the client when the transmission scheme is a short message service; and
transmitting a push message comprising the code information to the client when the transmission scheme is a push messaging,
wherein the code information comprises execution information indicating whether or not to forcibly execute the remote support service, region information in which the address of the relay server exists, and place information for determining a connection place on the relay server, wherein the place information is a unique number having a random value every time the unique number is generated.

8. The method of claim 7, wherein the transmitting of the generation request of code information comprises:
receiving, by the remote support server, an address of a tenant management server from a routing server based on tenant identification information included in the remote support service request;
obtaining, by the remote support server, an address of the relay server that exists in the same region as the address of the tenant management server; and
transmitting the generation request to the relay server based on the address of the relay server.

9. The method of claim 7, wherein the code information is generated as a combination of one or more numbers corresponding to the region information, one or more numbers corresponding to the execution information, and one or more numbers corresponding to the place information.

10. A method for force running of remote support, the method comprising:
receiving, by a code information receiver of a client, code information for connection to a terminal from a relay server for relaying a remote support service provided by a remote support server;
determining, by a connection determinator of the client, whether or not to connect between the relay server and the terminal based on the code information and authorization delegation setting of the terminal; and
controlling, by an agent of the client, the terminal based on a control signal transmitted from the remote support server when the remote support service is executed or sharing a screen of the terminal with the remote support server,
wherein the code information comprises execution information indicating whether or not to forcibly execute the remote support service, region information in which the address of the relay server exists, and place information for determining a connection place on the relay server, wherein the place information is a unique number having a random value every time the unique number is generated,
wherein the determining whether or not to connect between the relay server and the terminal comprises:
determining, based on the code information, by the connection determinator, whether or not to forcibly execute the remote support service;
connecting, by the connection determinator, the relay server and the terminal without receiving a separate request to access the terminal and without a user's input to grant an access to the terminal, regardless of the authority delegation setting of the terminal when the remote support service is determined to be forcibly executed; and when the remote support service is determined to be executed according to a preset setting of the terminal, by the connection determinator, connecting the relay server and the terminal only when the authority of the terminal is delegated, wherein the preset setting of the terminal indicates whether or not the authority to execute the remote support service is delegated to the remote support server.

11. The method of claim 10, further comprising:

after the determining whether or not to connect between the relay server and the terminal, executing, by the agent, the remote support service by accessing a connection place on the relay server based on the code information when connected to the relay server.

12. The method of claim 10, wherein the agent is automatically executed when the code information receiver receives the code information.

* * * * *